(12) United States Patent
Myers et al.

(10) Patent No.: US 9,676,499 B2
(45) Date of Patent: Jun. 13, 2017

(54) FUEL DEPOT IN SPACE

(71) Applicant: GATEWAY GALACTIC, INC., Ames, IA (US)

(72) Inventors: Justin J. Myers, Ames, IA (US); Floyd R. Richardson, Ames, IA (US)

(73) Assignee: Gateway Galactic, Inc., Ames, IA (US)

( * ) Notice: Subject to any disclaimer, the term of this patent is extended or adjusted under 35 U.S.C. 154(b) by 43 days.

(21) Appl. No.: 14/737,016

(22) Filed: Jun. 11, 2015

(65) Prior Publication Data

US 2016/0207641 A1 Jul. 21, 2016

Related U.S. Application Data

(60) Provisional application No. 62/106,021, filed on Jan. 21, 2015.

(51) Int. Cl.
| | | |
|---|---|---|
| *B64G 1/10* | (2006.01) | |
| *B64G 1/64* | (2006.01) | |
| *B64G 1/22* | (2006.01) | |
| *B64G 1/40* | (2006.01) | |
| B64G 1/44 | (2006.01) | |
| B64G 1/24 | (2006.01) | |
| B64G 1/26 | (2006.01) | |

(52) U.S. Cl.
CPC .......... *B64G 1/1078* (2013.01); *B64G 1/222* (2013.01); *B64G 1/402* (2013.01); *B64G 1/646* (2013.01); *B64G 1/242* (2013.01); *B64G 1/26* (2013.01); *B64G 1/44* (2013.01); *B64G 2001/224* (2013.01)

(58) Field of Classification Search
CPC .............................. B64G 1/1078; B64G 1/646
See application file for complete search history.

(56) References Cited

U.S. PATENT DOCUMENTS

| | | | | |
|---|---|---|---|---|
| 5,305,970 A * | 4/1994 | Porter | ................. | B64G 1/1078 244/135 R |
| 6,739,555 B2 * | 5/2004 | Mazanek | ............. | B64G 1/1078 244/172.4 |
| 7,114,682 B1 * | 10/2006 | Kistler | ..................... | B64G 1/40 244/172.2 |
| 7,156,348 B1 * | 1/2007 | Kistler | ................. | B64G 1/1078 244/172.4 |
| 7,559,508 B1 * | 7/2009 | Taylor | .................... | B64G 1/002 244/159.4 |
| 7,861,975 B2 * | 1/2011 | Behrens | ............... | B64G 1/1078 244/158.1 |
| 8,074,935 B2 * | 12/2011 | Gryniewski | ......... | B64G 1/1078 244/135 A |
| 8,196,868 B2 * | 6/2012 | Kutter | .................. | B64G 1/1078 244/158.1 |
| 8,196,869 B2 * | 6/2012 | Kutter | .................. | B64G 1/1078 244/158.1 |

(Continued)

*Primary Examiner* — Justin Benedik
(74) *Attorney, Agent, or Firm* — Zarley Law Firm, P.L.C.

(57) ABSTRACT

A fuel depot in space is provided. The fuel depot has a collapsible housing with a guidance, navigation, and control (GNC) system, a power management system, and a reaction control system (RNC). Connected to the housing are a plurality of fuel tanks that are connected via collapsible rods. The fuel tanks have pipe systems that are in communication with a plurality of pumps to transfer fuel from the tanks through a refueling arm and into a spacecraft during refueling.

8 Claims, 3 Drawing Sheets

(56) References Cited

U.S. PATENT DOCUMENTS

2007/0051854 A1* 3/2007 Behrens ............... B64G 1/1078
   244/172.3
2012/0080563 A1* 4/2012 Gryniewski ............. B25J 11/00
   244/172.5

* cited by examiner

FUEL DEPOT IN SPACE

CROSS REFERENCE TO RELATED APPLICATION

This application claims the benefit of U.S. Provisional Application No. 62/106,021 filed Jan. 21, 2015.

BACKGROUND OF THE INVENTION

This invention relates to the aerospace industry. More specifically, the invention advances the current capabilities of in space refueling procedures for long missions and expands the distance that spacecrafts can travel by allowing spacecrafts to refuel during their stages in orbit.

There are currently no other platforms in orbit that can perform a refueling operation on this level, as current designs are too bulky and limited in size due to mass considerations. The invention is a fuel depot placed in orbit to allow for refueling. The fuel depot is able to collapse down to a manageable size for a single launch into orbit and then to fully expand autonomously to its full size once in orbit. This saves money and space associated with launching this craft. The station is also fully autonomous, making the need for personnel to run the platform non-existent.

The invention includes 'inflatable' fuel tanks with telescoping rods allowing them to fully collapse into themselves reducing the overall size of the tanks at the time of launch. The skin of the tanks are made out of a lightweight material, such as Mylar, that is also durable enough to withstand the negative pressures of space while safely containing fuel.

The fuel depot includes at least one fuel tank, a guidance, navigation, and control (GNC) system, hypergolic thrusters, a pump, and a plurality of solar panels. In one embodiment of the fuel depot includes five tanks to accommodate the potential need of the customer. Two of the tanks are used to store liquid oxygen (LOX), two are used to store rocket grade kerosene (RP1), and the final tank is used as a reserve/fail safe in the event of a catastrophic failure of one of the aforementioned tanks.

BRIEF SUMMARY OF THE PRESENT INVENTION

A fuel depot in space. The invention is configured to be implemented in space to fully facilitate the need for in-flight refueling operations. The fuel tanks are fully collapsible for a reduction in overall craft volume. The fuel tanks are inflatable to hold a greater amount of fuel over what is currently available. The fuel tanks are supported by, but not limited to, telescoping rods.

DETAILED DESCRIPTION OF THE INVENTION

Figure 1:
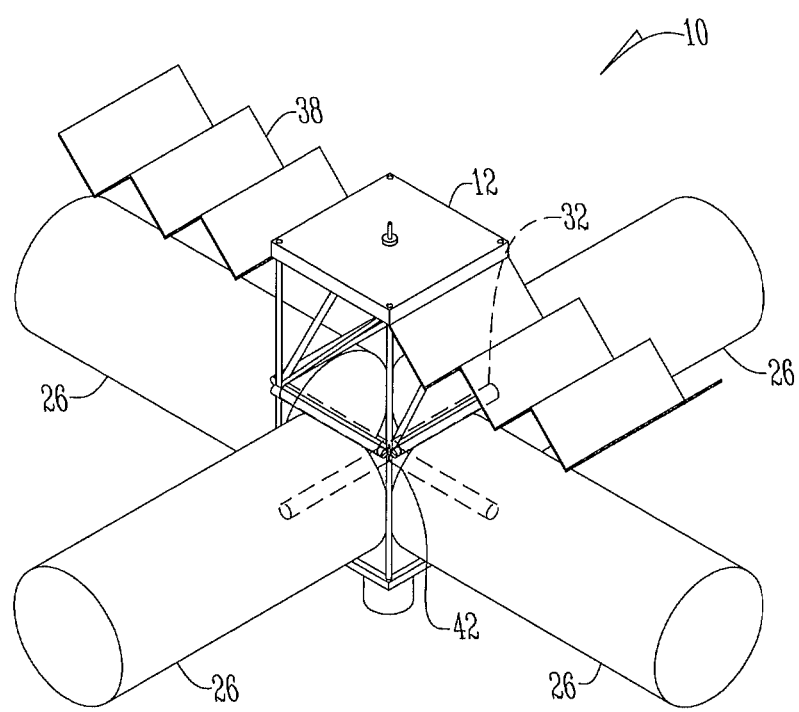
FIG. 1 is a perspective view of a fuel depot in space.
Figure 2:
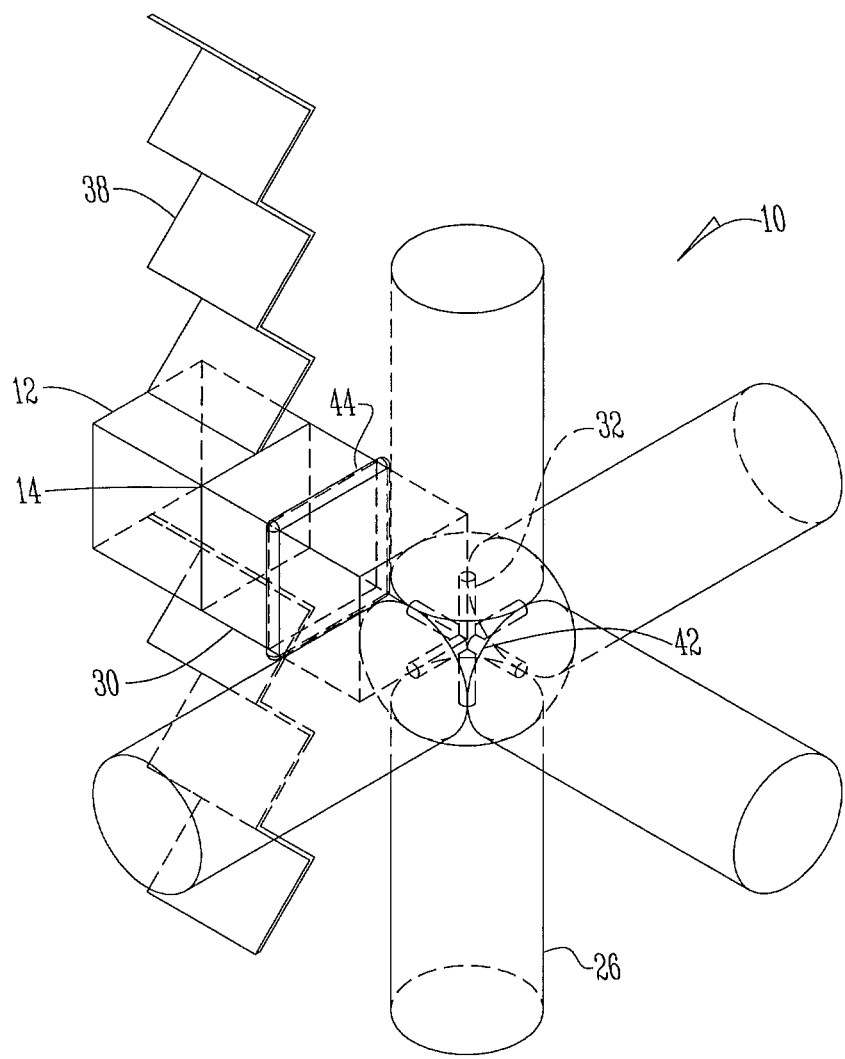
FIG. 2 is a perspective view of a fuel depot in space.
Figure 3:
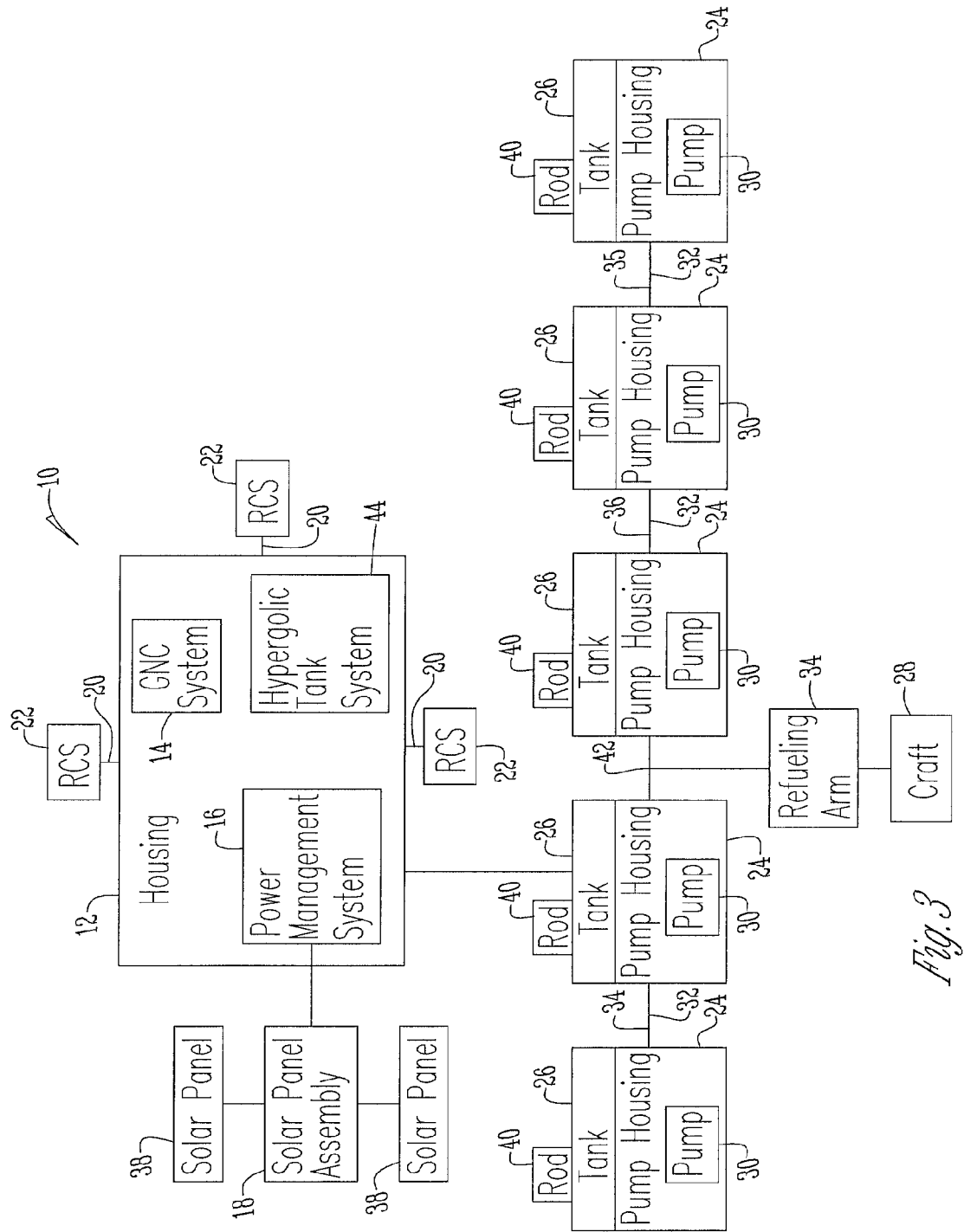
FIG. 3 is a schematic view of a fuel depot in space.

Referring to the figures, a fuel depot 10 is disclosed and is comprised of a housing 12 that contains a GNC system 14 and all the parts integrated specifically to handle the computing tasks of keeping the fuel depot 10 in orbit and performing fueling operations autonomously. Within the housing 12 is a power management system 16 to collect power from a solar panel assembly 18 and store the power for later use. Surrounding the housing 12 are mounts 20 for a reaction control system (RCS) 22 to keep the orientation and orbit of the fuel depot 10 stable during fueling operations and idle operations.

A pump housing 24 holds the necessary equipment to pump the components from the tanks 26 and out to a craft 28 during fueling. Each fuel tank 26 has a designated pump 30 to avoid the complications of contaminating a fuel component with oxidizer or vice versa, thus keeping the mixtures pure to be mixed later by the receiving craft 28. The pumps 30 are connected to individual pipe systems 32 that are in communication with their perspective tanks 26. There is also a pipe system 32 coming in from a refueling arm 34 that transports the fuel from the pump housing 24 to the craft 28. In one embodiment there are two pumps 30 per fuel type. A joint 35 connects the two like fuel pumps 30 to a combined pipe 36. In one embodiment, there are two combined pipes 36 that hold different fuels, such as LOX and one RP1.

The solar panel assembly 18 serves as the main power generating system of the fuel depot 10. There are two fully collapsible solar panels 38 that extend out to full length once the fuel depot 10 is in orbit to fully power the fuel depot 10 during idle operations and fueling operations. In an alternative embodiment, the two solar panels 38 are assembled into a multi-panel, dual-purpose solar panel assembly 18 that functions as both a solar array and a heat shield. In one embodiment of this alternative, the solar panels 38 are made out of triangular segments.

The fuel tanks 26 are the main storage bodies of the fuel depot 10. The fuel tanks 26 are inflatable and in one embodiment are made out of the lightweight material, such as Mylar. Connected to the fuel tanks 26 are telescoping rods 40 that are in a retracted position prior to orbit and in a protracted position once in orbit, thereby allowing the fuel tanks 26 and the housing 12 of the fuel depot 10 to be collapsed during launch and then expanded once orbit is entered. Additionally, the fuel tanks 26, once in orbit, are inflated autonomously. Each fuel tank 26 holds only one of the two fuel components, LOX or RP1, except for the reserve tank 26, which will be empty until use of it is required. In other embodiments the tanks 26 can hold a combination of fuels or the fuel tanks 26 may be partitioned to allow containment of multiple fuels.

The pipe junction 42 is positioned at the intersection of the piping systems 32, one per tank 26, and makes a 90 degree bend with respect to each of the adjacent piping systems 32. The only pipe system 32 that does not make this bend is the reserve tank 26 pipe system 32 which continues along the axis of the fuel depot 10 to the reserve tank 26.

The RCS 22 hypergolic tank system 44 is the storage system for the fuel of the RCS 22 thrusters. Since hypergolics are ignited by the two components being mixed, the hypergolic tank system 44 is similar to the fuel tank 26 arrangement that allows all the components for the fuel to remain separated until the fuel is mixed in the RCS thruster 22.

In operation, the fuel depot 10 is in a collapsed position prior to launch. While in the collapsed position the fuel tanks 26 and housing 12 are collapsed and the telescoping rods 40 are in the retracted position. The fuel depot 10 is launched and travels to the desired orbit, which can include low earth orbit, geosynchronous orbit, Earth-Moon L3 Lagrange Point, or any other orbit. Once in orbit the fuel depot 10 extends the telescoping rods 40 to the protracted position and the fuel tanks 26 and the housing 12 are transitioned to an expanded position.

Once in the expanded position, the fuel tanks 26 are filled with the respective fuel, except for the reserve tank 26, which remains empty. When a craft 28 arrives for refueling the RCS system 22 is activated by drawing fuel from the hypergolic tank system 44 to drive the RCS thrusters 22 to stabilize the fuel depot 10 during refueling. The craft 28 connects to the refueling arm 24. Fuel is transferred from the fuel tanks 26 to the craft 28 by each fuel tanks 26 pump 30, which transfers fuel from the tanks 26 through the pipe systems 32 to the pipe junction 42 and out to the craft 28 through the refueling arm 24.

The fuel depot 10 is continually powered using the solar panel system 18, which includes a plurality of solar panels 38 that are in the collapsed position prior to launch by transition to the expanded position when orbit is entered. Unused energy is stored by the solar panel system 18 for later use by the fuel depot 10.

From the above discussion and the accompanying figures and claims it will be appreciated that the fuel depot 10 offers many advantages over the prior art. That is, the fuel depot 10 provides a compact and lightweight system for refueling crafts 28 as well as many other advantages and improvements over the prior art. It will be appreciated by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included within the spirit and purview of this application.

What is claimed is:

1. A fuel depot, comprising:
    a collapsible housing having a guidance, navigation, and control (GNC) system, a power management system, and a reaction control system (RNC);
    a plurality of fuel tanks connected to the housing with a plurality of telescoping rods;
    the plurality of fuel tanks having a pipe system in communication with a plurality of pumps; and
    a refueling arm connected to at least one pump for refueling a spacecraft.

2. The fuel depot of claim 1 wherein the fuel tanks are made of a lightweight material.

3. The fuel depot of claim 1 wherein the fuel tanks are inflatable.

4. The fuel depot of claim 1 wherein the telescoping rods are in a retracted positioned during launch and in a protracted position when in orbit.

5. The fuel depot of claim 1 wherein the fuel depot is positioned in low earth orbit.

6. The fuel depot of claim 1 wherein the fuel depot is positioned in geosynchronous orbit.

7. The fuel depot of claim 1 wherein the power management system is connected to a solar panel assembly having a plurality of collapsible solar panels.

8. The fuel depot of claim 1 wherein the fuel tanks are made of Mylar.

\* \* \* \* \*